United States Patent [19]

Morrison

[11] Patent Number: 4,846,924

[45] Date of Patent: Jul. 11, 1989

[54] METHOD AND APPARATUS FOR CONVERTING HAND-HELD THERMAL LABELER TO A TABLE TOP PRINTER

[75] Inventor: Donald A. Morrison, Dayton, Ohio

[73] Assignee: Monarch Marking Systems, Inc., Dayton, Ohio

[21] Appl. No.: 207,463

[22] Filed: Jun. 16, 1988

[51] Int. Cl.[4] ........................ B41M 5/26; B41J 11/26; B23P 23/00

[52] U.S. Cl. .................................. 156/384; 29/401.1; 29/428; 400/692; 400/693; 400/120; 400/88; 156/579; 156/584; 156/DIG. 48; 156/DIG. 49

[58] Field of Search ............................ 29/401.1, 428; 101/93.04, 93.05; 156/384, 577, 579, DIG. 48, DIG. 49, DIG. 33, 584; 400/78, 88, 103, 120, 691, 692, 693; 346/76 PH

[56] References Cited

U.S. PATENT DOCUMENTS

| | | | |
|---|---|---|---|
| 4,479,843 | 10/1984 | Neuhard et al. | 156/384 |
| 4,579,466 | 4/1986 | Sato et al. | 156/384 X |
| 4,614,561 | 9/1986 | Mistyurik | 156/384 |
| 4,647,235 | 3/1987 | Sato | 400/88 X |
| 4,706,096 | 11/1987 | Sato | 156/384 X |
| 4,734,710 | 3/1988 | Sato et al. | 400/692 X |

FOREIGN PATENT DOCUMENTS

| | | | |
|---|---|---|---|
| 0035004 | 9/1981 | European Pat. Off. | 400/88 |

*Primary Examiner*—Carl E. Hall
*Assistant Examiner*—Peter D. B. Vo
*Attorney, Agent, or Firm*—Joseph J. Grass

[57] ABSTRACT

There is disclosed a thermal hand-held labeler which can be converted to a table top printer by using method and apparatus according to the invention. The labeler has modular components which can be detachably connected to each other, and the modular components can be detachably connected to a base unit to provide a table top printer.

18 Claims, 3 Drawing Sheets

METHOD AND APPARATUS FOR CONVERTING HAND-HELD THERMAL LABELER TO A TABLE TOP PRINTER

BACKGROUND OF THE INVENTION

1. Field of the Invention

This invention relates to the art of labelers and table top printers.

2. Brief Description of the Prior Art

A well-known thermal hand-held labeler is disclosed in U.S. Pat. No. 4,544,434 of John D. Mistyurik granted Oct. 1, 1985 to Monarch Marking Systems, Inc. U.S. Pat. No. 4,647,235 discloses a thermal printing cassette mountable in a thermal printer.

SUMMARY OF THE INVENTION

This invention relates to method and apparatus for converting a thermal hand-held labeler to a table top printer, and vice versa. The labeler has modular, detachably connected components. When it is desired to convert the labeler to a table top printer, the modules are detached and at least the printer module is connected to a stationary base unit.

It is an object of the invention to enable the user of a hand-held thermal labeler to convert the labeler to a table top printer by detaching modular components of the labeler and electrically connecting some or all of the modular components to a base unit.

It is a further object of the invention to provide method and apparatus by which a printer module and at least one other module of a thermal hand-held labeler can be detached and at least the printer module can be electrically connected to a base unit.

It is a further object of the invention to provide a thermal hand-held labeler having a printer module and also a base unit by which the labeler can be converted into a table top printer, in which the printer module can be powered either by a battery or by an external source through the base unit.

It is another object of the invention to provide a thermal hand-held labeler and a base unit in which modular components of the labeler can be detached and plugged into the base unit to convert the thermal hand-held labeler into a thermal table top printer.

In accordance with a specific embodiment of the invention, there is provided method and apparatus for converting a thermal hand-held labeler to a table top or stationary printer. The labeler can include a labeler module or printer module in which labels are printed, delaminated from a carrier web, and dispensed into underlying relationship to an applicator. The printer module is detachably connected to a source of power such as a rechargeable battery, preferably but not necessarily, located in the handle. When the battery is located in the handle, the handle is preferably detachably connected to the printer module. The printer module is adapted to be connected to a base unit and preferably either the battery-containing handle or another source of electrical energy is also adapted to be connected to the base unit.

Other objects of the invention will be readily apparent to those skilled in the art with reference to the following detailed description and the accompanying drawings.

DETAILED DESCRIPTION OF THE PREFERRED EMBODIMENT

Figure 1:
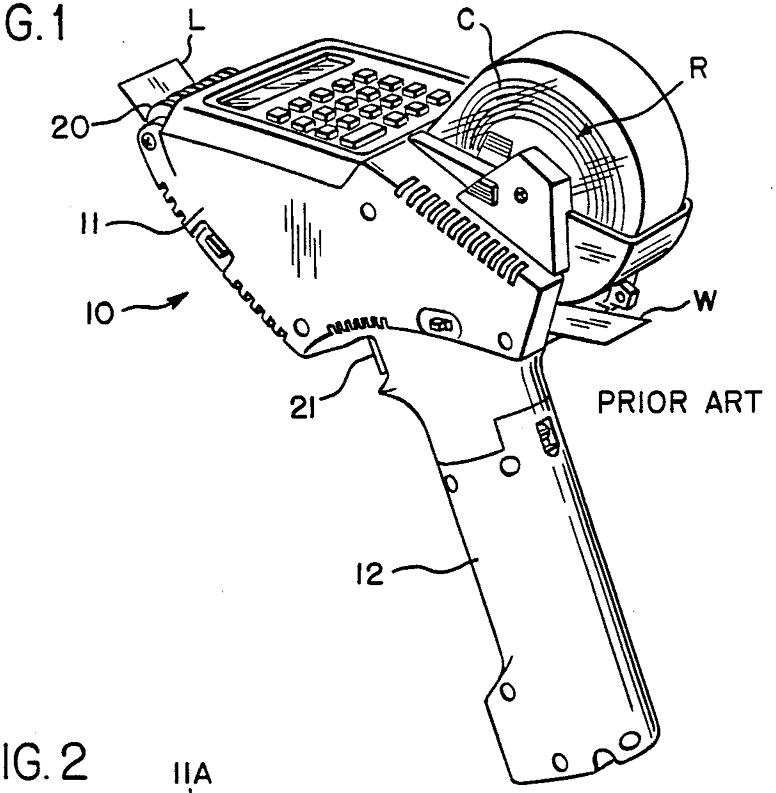
FIG. 1 is a perspective view of a prior art thermal hand-held labeler.
Figure 2:
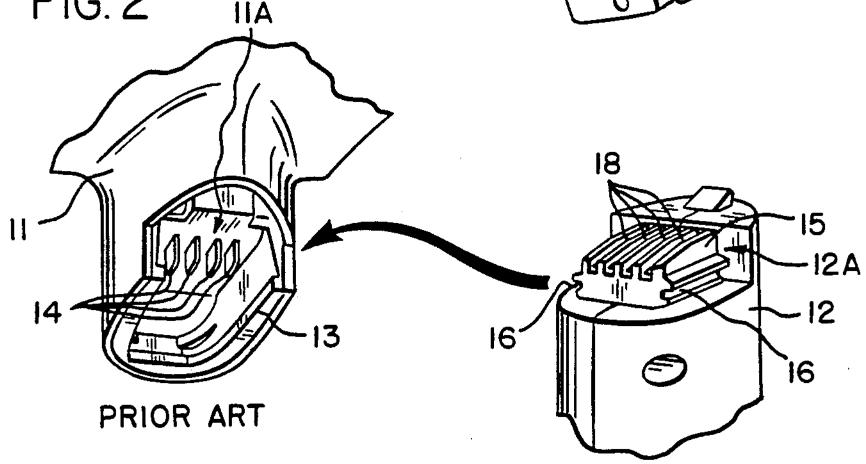
FIG. 2 is a fragmentary perspective view of the printer module and the power module.

With reference to FIG. 1 there is shown a perspective view of a thermal hand-held labeler 10 of the type sold by Monarch Marking Systems, Inc., Dayton, Ohio, assignee of the present application. A specific embodiment of the labeler 10 is disclosed in U.S. Pat. No. 4,544,434, the disclosure of which is incorporated herein by reference. The labeler 10 is shown to include a printer module or labeler module 11 and a power module 12. The modules 11 and 12 are detachably connected as best shown in the rotated perspective view of FIG. 2. The module 11 has a first-type electrical connector generally indicated at 11A with a U-shaped ridge or tongue 13 and four electrical contact prongs 14. The module 12 has a second-type electrical connector 12A including a contact shield 15 having parallel slots 16 and four leaf spring contacts 17. The power module 12 is slidable onto and off the printer module 11. The connectors 11A and 12A connect and disconnect from each other by sliding action. The slots 16 receive the ridge 13. The prongs 14 enter slots 18 in the shield and contact the respective contacts 17. The contacts 17 are not visible in FIG. 2 but are identical to the contacts 17 of the connector 12A shown in FIG. 4. One pair of prongs 14 and one pair of spring contacts 17 provide electrical connection between rechargeable batteries 19 in the module 12 and the printer module 11. The other pair of prongs 14 and contacts 17 provide for data input from the module 12 to the printer module 11.

The labeler 10 mounts a roll of a composite web C of pressure sensitive labels L releasably adhered to a carrier web W. The composite web C is drawn off roll R, is printed using a thermal print head (not shown), the printed labels L are delaminated from the carrier web W and the delaminated labels L are advanced into label applying relationship with respect to an applicator 20 each time a manually operable button 21 is operated.

Figures 3, 4:
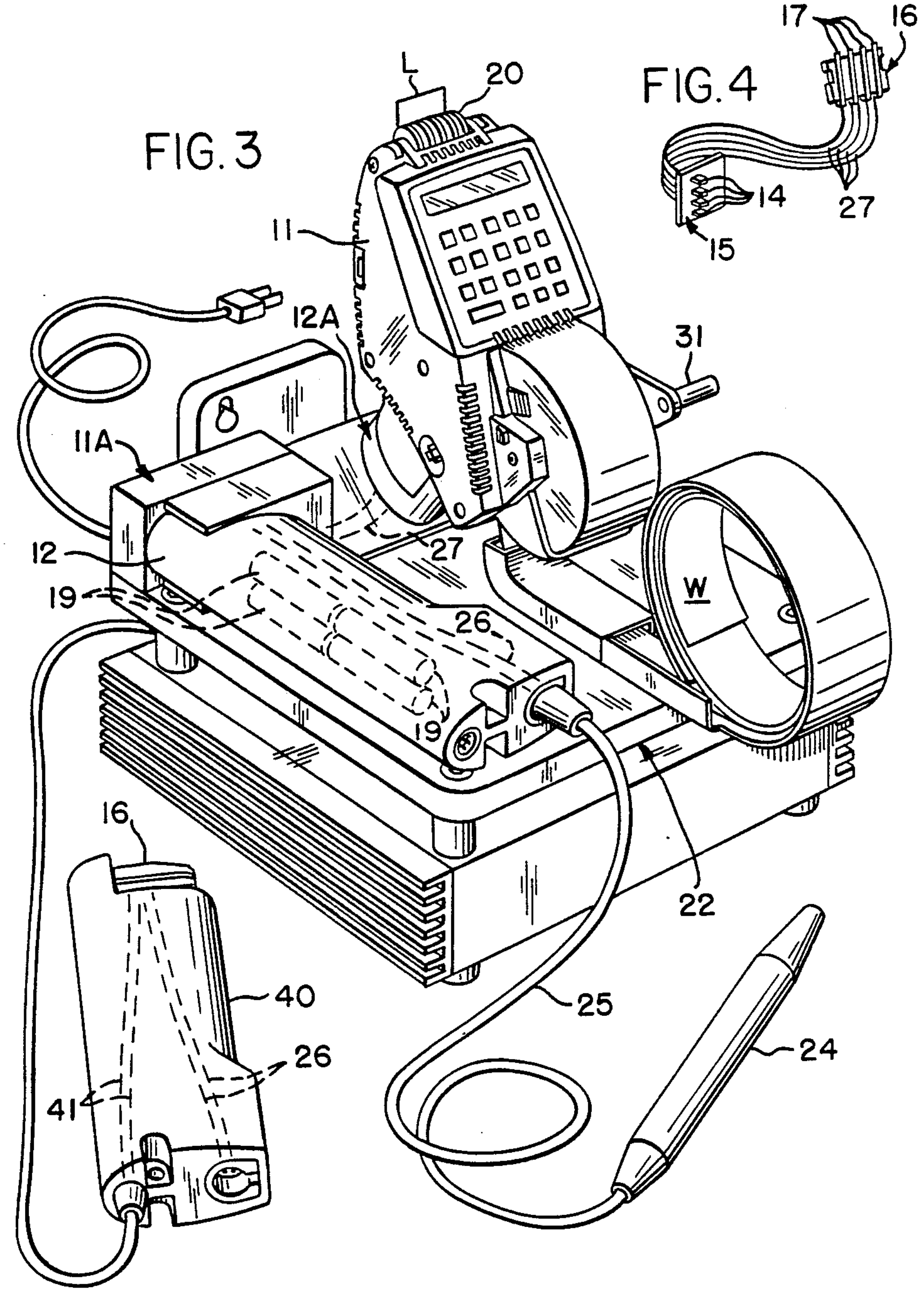
FIG. 3 is a perspective view of a base unit with the printer module and the power module plugged into the base unit, together with a light pen and an alternative power module.
FIG. 4 is a perspective view of the electrical connectors of the base unit electrically connected by conductors.
Figure 6:
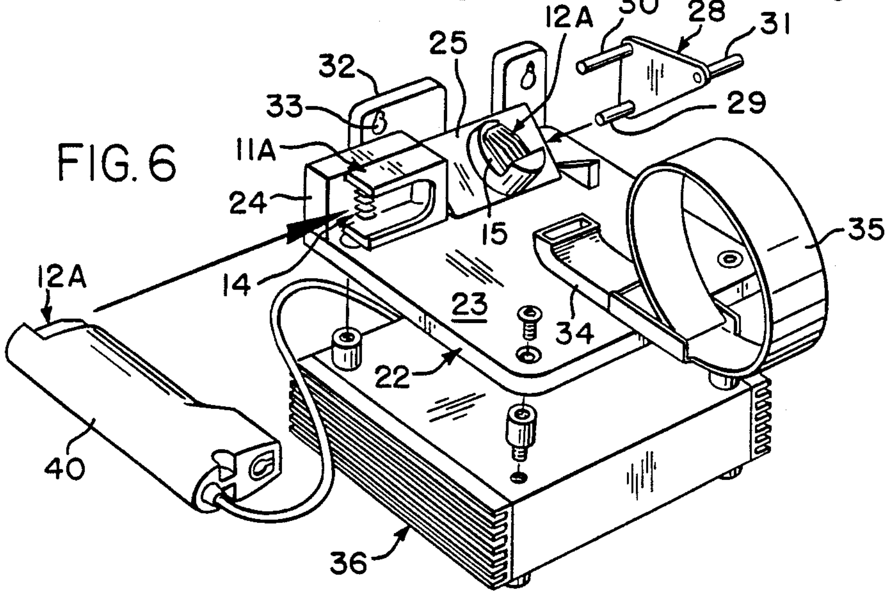
FIG. 6 is a partially exploded perspective view of the base unit together with the power supply unit and the alternative power module.

FIG. 3 shows the printer module 11 and the power module 12 as having been detached from each other and attached to a base unit generally indicated at 22. As best shown in FIG. 6, the base unit 22 has a horizontal plate 23, a vertical wall 24 secured to the plate 23 and an inclined support 25. The wall 24 mounts a first-type connector 11A, and the support 25 mounts a second-type connector 12A. The connectors 11A and 12A on the base unit 22 are shown in perspective in FIG. 3. It is apparent that the connector 11A on the base unit 22 duplicates the connector 11A on the printer module 11, and the connector 12A on the base unit 22 duplicates the connector 12A on the power module 12. Instead of the printer module 11 plugging into the power module 12 as shown in FIG. 1, FIG. 3 shows the printer module 11 as plugging into the connector 12A on the base unit 22, and the power module 12 as plugging into the connector 11A. As shown, the power module 12 can be equipped with a light pen 24 for supplying data through a data cord 25 into the power module 12, through conductors 26, through two of the prongs 14, over two of the conductors 27, and to the printer unit 11.

It is apparent that the batteries 19 provide electrical energy through electrical connectors 11A and 12A and over conductors 27 on the base unit 22 to the printer module 11 when the printer module 11 and the power module 12 are connected as shown in FIG. 3.

Pivotally mounted on the base unit 22 is an actuator 28 having a pivot pin 29 received in the support 25, a button-engageable stud 30, and a finger-engageable stud 31. As viewed in FIG. 5, manual engagement of the stud 31 and consequent counterclockwise pivoting of the actuator 28 will cause the stud 30 to operate the button 21 to cause a label L to be printed, delaminated and dispersed to the position shown.

The base unit 22 is also provided with a bracket 32 with mounting holes 33 so that the base unit 22 can be mounted to a wall, if desired.

The base plate 23 also mounts a removable discharge chute 34 for the carrier web W and a removable rewinder 35 for rewinding the carrier web W. As shown in FIG. 3, the carrier web W simply winds up inside the rewinder 35 as the carrier web W advances.

In the event it is desired to use a conventional power supply instead of a battery for the source of electrical energy, there is provided a power supply unit 36 shown to be suitably secured to the underside of the base plate 23. The power supply unit 36 has a conventional power cord 37 with a plug 38 for connection to an A.C. outlet. Connected to the output of the power supply unit 36 is a power cord 39 which supplies D.C. power to an alternative form of power module 40. The module 40 is identical to the module 12 except that the power module 40 has no battery, but instead the power cord 39 is connected to conductors 41 (FIG. 3) which conduct electrical energy through the connector 16 on the power module 40, to the connector 11A on the base unit 22, through two of the conductors 27, through the connector 12A on the base unit 22, and to the printer module conductor 11A. Thus, the printer module 11 can be supplied either with battery power by using the power module 12 or by converted line power using the power module 40. As shown, the module 40 also has conductors 26 for conducting data.

Figure 5:
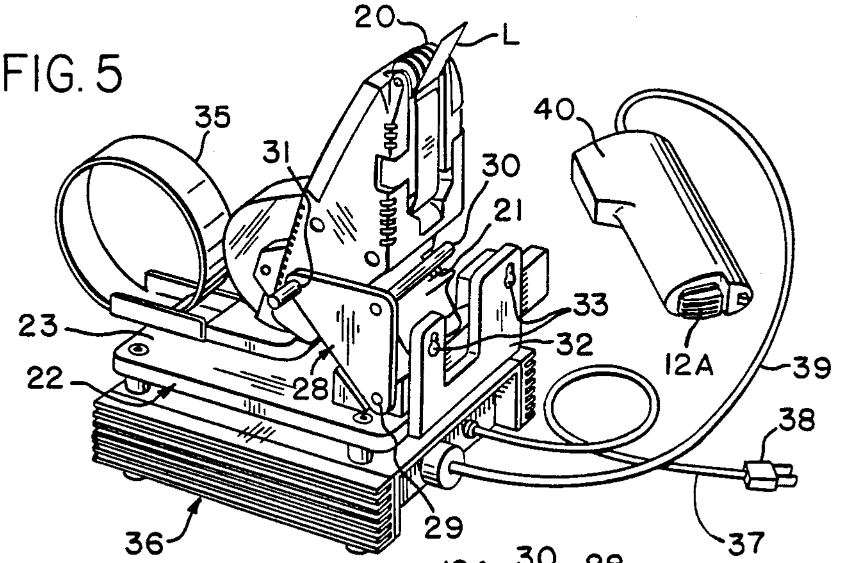
FIG. 5 is a perspective view of the structure shown in FIG. 3 but from a different angle.

When it is desired to convert the labeler 10 to a table top printer, the power module 12 is detached from the printer module by sliding the module 12 relative to the module 11 until the slots 16 have moved clear of the ridge 13. Thereafter, the connector 11A of the module 11 is connected to the connector 12A on the base unit 22 by the same sliding action as is used to connect the power module 12 to the printer module 11. If desired, the power module 11 can be connected to the connector 11A on the base unit by using this type of sliding action. Now with the modules 11 and 12 plugged into the base unit 22 as shown in FIGS. 3 and 5, the resulting assembly is ready to function as a table top printer which prints and dispenses labels L. The resulting assembly is portable and can readily be moved from place-to-place by the user. The assembly can also ride on a suitable cart, if desired.

Alternatively, instead of using the power module 12, the power module 40 can be used in its place, in which event the plug 38 is simply plugged into a conventional electrical outlet.

Other embodiments and modifications of the invention will suggest themselves to those skilled in the art, and all such of these as come within the spirit of this invention are included within its scope as best defined by the appended claims.

I claim:

1. Method of converting a hand-held thermal labeler to a table top thermal printer, comprising a steps of: providing a thermal hand-held labeler including a thermal printer module and a detachable handle module having a rechargeable battery, the printer module using a composite label web having labels releasably adhered to a carrier web, and the printer module having an applicator for applying printed and delaminated labels from the carrier web, the printer module having a first-type electrical connector and the handle module having a second-type electrical connector adapted to be electrically connected to each other, providing a base unit with electrically connected first-type and second-type electrical connectors, detaching the handle module from the printer module, connecting the printer module to the second-type connector on the base unit, and connecting the handle module to the first-type connector on the base unit.

2. Method of converting a hand-held thermal labeler to a table top thermal printer, comprising the steps of: providing a hand-held thermal labeler having at least two connectable modules, wherein one of the modules is a power module for providing electrical energy, wherein the modules are plugged together using plug-type connectors, providing a base unit with electrically connected plug-type electrical connectors, disconnecting the labeler by unplugging the modules, and plugging the modules into the electrical connectors on the base unit.

3. Method as defined in claim 2, wherein the power module comprises a handle.

4. Method of converting a hand-held thermal labeler to a table top thermal printer, comprising the steps of: providing a hand-held thermal labeler having a printer module and a power module, the printer module having a first-type electrical connector and the power module having a second-type electrical connector adapted to electrically connect the printer module and the power module, providing a base unit having a first-type electrical connector and a second-type electrical connector electrically connected to the first-type electrical connector, disconnecting the printer module and the power module at their first-type and second-type connectors, connecting the first-type connector of the printer module to the second-type connector on the base unit, and connecting the second-type connector of the power module to the first-type connector on the base unit.

5. Method as defined in claim 4, wherein the power module comprises a handle.

6. In combination, a hand-held thermal labeler including a thermal printer module and a detachable handle module having a rechargeable battery, wherein the printer module uses a composite label web having labels releasably adhered to a carrier web, an applicator for applying printed and delaminated labels, the printer module having a first-type electrical connector and the handle module having a second-type electrical connector adapted to be electrically connected to each other, and a base unit having a said first-type electrical connector and a said second-type electrical connector electrically connected to each other, wherein the printer module and the handle module are capable of being detached and the printer module can be connected to the second-type connector on the base unit and the handle module can be connected to the first-type connector on the base unit, wherein when the first-type electrical connector on the printer module and the second-type electrical connector on the handle module are connected a hand-held labeler is provided, an wherein when the first-type electrical connector on the base unit and the second-type electrical connector on the handle module are connected and the second-type electrical connector on the base unit and the first type electrical connector on the printer module are connected a table top printer is provided.

7. The combination as defined in claim 6, including means for rewinding the spent carrier web.

8. In combination, at least two plug connectable modules, wherein one of the modules is a printer module and another of the modules is a power module for providing electrical energy to the printer module, the modules having plug-type electrical connectors for plugging the modules into each other to provide a thermal hand-held labeler, and a base unit having electrically connected plug-type electrical connectors for individually plugging in all of said modules to provide a table top printer.

9. Method as defined in claim 8, wherein the power module comprises a handle.

10. In combination, a hand-held thermal labeler having a printer module and a power module for providing electrical energy, the printer module having a first-type electrical connector and the power module having a second-type electrical connector for electrically connecting the printer module and the power module, a base unit having a said first-type electrical connector and a said second-type electrical connector electrically connected thereto, and wherein a table top printer is provided when the printer module is coupled by the first-type connector on the printer module to the second-type connector on the base unit and when the power module is coupled by the second-type connector on the power module to the first-type connector on the base unit.

11. The combination defined in claim 10, wherein the power module comprises a handle.

12. Method of converting a hand-held thermal labeler to a table top thermal printer, comprising the steps of: providing a hand-held thermal labeler having a printer module and a power module with a rechargeable battery, the printer module having a first-type electrical connector and the power module having a second-type electrical connector for electrically connecting the printer module and the power module, providing a base unit having a second-type electrical connector for electrical connection to the printer module, providing the base unit with a first-type electrical connector electrically connected to the second-type electrical connector on the base unit, disconnecting the printer module and the power module at their first-type and second-type connectors, connecting the first-type electrical connector of the printer module to the second-type electrical connector on the base unit, the power module with the rechargeable battery being a first power module, providing a second power module having a second-type electrical connector for connection to a source of electrical energy, and selectively connecting either the first power module or the second power module to the first-type electrical connector on the base unit.

13. Method as defined in claim 12, wherein the power module comprises a handle.

14. In combination, a hand-held thermal labeler having a printer module and a power module with a rechargeable battery, the printer module having a first-type electrical connector, the power module having a second-type electrical connector for connection to the first-type electrical connector, a base unit including a said second-type electrical connector for connection to the first-type connector on the printer module, wherein the base unit further includes a first-type electrical connector for connection to the second-type connector of the power module, and wherein the first-type and second-type connectors on the base unit are electrically connected to each other.

15. The combination as defined in claim 14, wherein the power module comprises a handle.

16. In combination, a hand-held thermal labeler having a printer module and a power module with a rechargeable battery, the printer module having a first-type electrical connector, the power module having a second-type electrical connector for connection to the first-type electrical connector, a base unit including a said first-type electrical connector and a said second-type electrical connector electrically connected to each other, wherein the printer module can be attached to the base unit by coupling the first-type connector of the printer module to the second-type connector on the base unit, wherein the power module with the rechargeable battery constitutes a first power module, a second power module having a second-type electrical connector for connection to a source of electrical energy, and wherein either the first power module or the second power module is selectively connected to the first-type connector on the base unit.

17. The combination as defined in claim 16, wherein the source of electrical energy for the second power module includes a power supply in underlying relationship and attached to the base unit.

18. The combination as defined in claim 16, wherein the power module comprises a handle.

* * * * *

UNITED STATES PATENT AND TRADEMARK OFFICE
CERTIFICATE OF CORRECTION

PATENT NO. : 4,846,924

DATED : July 11, 1989

INVENTOR(S) : Donald A. Morrison

It is certified that error appears in the above-identified patent and that said Letters Patent is hereby corrected as shown below:

Column 5, line 13, "an" should be --and--; line 22, "plug connectable" should be --plug-connectable--.

Signed and Sealed this

Twenty-second Day of May, 1990

*Attest:*

HARRY F. MANBECK, JR.

*Attesting Officer*

*Commissioner of Patents and Trademarks*